(12) United States Patent
Hwang et al.

(10) Patent No.: US 9,638,288 B2
(45) Date of Patent: May 2, 2017

(54) PLANETARY GEAR TRAIN OF AUTOMATIC TRANSMISSION FOR A VEHICLE

(71) Applicant: Hyundai Motor Company, Seoul (KR)

(72) Inventors: Dong Hwan Hwang, Seoul (KR); Sueng Ho Lee, Seoul (KR); Chang Wook Lee, Suwon-si (KR); JongSool Park, Hwaseong-si (KR); KyeongHun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/934,064

(22) Filed: Nov. 5, 2015

(65) Prior Publication Data

US 2016/0333978 A1 Nov. 17, 2016

(30) Foreign Application Priority Data

May 13, 2015 (KR) ........................ 10-2015-0066913

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS 9,103,414 B1 * 8/2015 Goleski .................... F16H 3/66

FOREIGN PATENT DOCUMENTS

| JP | 2014-500460 A | 1/2014 |
| JP | 2014-500461 A | 1/2014 |
| KR | 10-2012-0133578 A | 12/2012 |
| KR | 10-2013-0000172 A | 1/2013 |

* cited by examiner

*Primary Examiner* — Justin Holmes
(74) *Attorney, Agent, or Firm* — Morgan, Lewis & Bockius LLP

(57) ABSTRACT

A planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, an eleventh, and a twelfth rotating element, and six control elements disposed between one of the rotating elements and another or the input shaft, between one of the rotating elements and the output shaft, or between one of the rotating elements and a transmission housing.

20 Claims, 3 Drawing Sheets

FIG. 3

| | transmission control element | | | | | speed ratio | step ratio | entire speed ratio |
|---|---|---|---|---|---|---|---|---|
| | B1 | B2 | C1 | C2 | C3 | C4 | | | |
| 1ST | | ● | | | ● | | 5.369 | 1.627 | 9.100 |
| 2ND | | ● | | | ● | | 3.300 | 1.454 | |
| 3RD | | ● | | ● | | | 2.269 | 1.366 | |
| 4TH | | ● | ● | ● | | ● | 1.661 | 1.357 | |
| 5TH | | | ● | | | ● | 1.224 | 1.224 | |
| 6TH | | | ● | ● | | ● | 1.000 | 1.155 | |
| 7TH | | | ● | ● | ● | | 0.866 | 1.214 | |
| 8TH | ● | | ● | | ● | | 0.713 | 1.208 | |
| 9TH | ● | | ● | | | ● | 0.590 | - | |
| REV | ● | ● | | | | ● | -4.325 | | |

PLANETARY GEAR TRAIN OF AUTOMATIC TRANSMISSION FOR A VEHICLE

CROSS-REFERENCE TO RELATED APPLICATION

The present application claims priority to Korean Patent Application Number 10-2015-0066913 filed May 13, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle which implements forward 9-speeds and increases an entire speed ratio by a minimum configuration to improve power transmission performance and fuel efficiency and secure linearity of step ratios between transmission stages.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8 and 9-speed automated transmissions tend to be implemented and the research and development of a planetary gear train capable of implementing more transmission steps has also been actively conducted.

However, improvement effect of fuel efficiency is not so good in case of an 8-speed automated transmission, because an entire speed ratio is maintained in a level of 6.5~7.5.

Therefore, development of at least a 9-speed high efficiency automatic transmission is required in that operation efficiency of an engine and drivability of a vehicle are deteriorated because linearity of step ratios between transmission stages can't be secured in case of enabling an entire speed ratio of an 8-speed automated transmission to be a level more than or equal to 9.0.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which implements forward 9-speed and reverse 1-speed transmission steps with a minimum configuration, improves power transmission efficiency and fuel efficiency through increasing an entire speed ratio, and secures linearity of step ratios between transmission stages.

According to various aspects of the present invention, a planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, an eleventh, and a twelfth rotating element, and six control elements disposed between one of the rotating elements and another or the input shaft, between one of the rotating elements and the output shaft, or between one of the rotating elements and a transmission housing, in which the input shaft may be directly connected with the eighth rotating element, the output shaft may be directly connected with the eleventh rotating element and selectively connected with the ninth rotating element simultaneously, the eleventh rotating element may be selectively connected with the ninth rotating element, the third rotating element may be directly connected with the tenth rotating element, the third rotating element may be directly connected with the seventh rotating element, the second rotating element may be selectively connected with the sixth rotating element, the fourth rotating element may be directly connected with the ninth rotating element, and the first rotating element may be directly connected with the transmission housing, and the planetary gear train may implement transmission steps of 9 forward speeds and at least one reverse speed while three control elements operate among the six control elements.

The fifth rotating element may be selectively connected with the transmission housing and the seventh rotating element simultaneously, the twelfth rotating element may be selectively connected with the transmission housing, and at least two of the fourth, the fifth, and the sixth rotating element in the second planetary gear set may be selectively connected with other rotating elements respectively.

The first, the second, and the third rotating elements of the first planetary gear set may be a sun gear, a planetary carrier, and a ring gear respectively, the fourth, the fifth, and the sixth rotating elements of the second planetary gear set may be a sun gear, a planetary carrier, a ring gear respectively, the seventh, the eighth, and the ninth rotating elements of the third planetary gear set may be a sun gear, a ring gear, and a planetary carrier respectively, and the tenth, the eleventh, and the twelfth rotating elements of the fourth planetary gear set may be a sun gear, a planetary carrier, and a ring gear respectively.

The six control elements may include two brakes and four clutches.

According to various aspects of the present invention, a planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, a eleventh, and a twelfth rotating element, six control elements disposed between one of the rotating elements and another or the input shaft, between one of the rotating elements and the output shaft, or between one of the rotating elements and a transmission housing, a first rotating shaft including the first rotating element and directly connected with a transmission housing, a second rotating shaft including the second rotating element, a third rotating shaft including the third, the seventh, and tenth rotating elements, a fourth rotating shaft including the fourth rotating element and the ninth rotating element, a fifth rotating shaft including the fifth rotating element and selectively connected with the third rotating shaft and the transmission housing simultaneously and selectively connected with the input shaft, a sixth rotating shaft including the sixth rotating element, selectively connected with the second rotating shaft, and connected with the fifth rotating shaft, a seventh rotating shaft including the eighth rotating element and directly connected with the input shaft, an eighth rotating shaft including the eleventh rotating element and operating continuously as an output element by being selectively connected with the fourth rotating shaft and directly connected with the output shaft simultaneously, and a ninth rotating shaft including the twelfth rotating element and selectively connected with the transmission housing.

The first planetary gear set may be a single-pinion planetary gear set, the first rotating element may be a first sun gear, the second rotating element may be a first planetary carrier, and the third rotating element may be a first ring gear, the second planetary gear set may be a single-pinion planetary gear set, the fourth rotating element may be a second sun gear, the fifth rotating element may be a second planetary carrier, and the sixth rotating element may be a second ring gear, the third planetary gear set may be a double-pinion planetary gear set, the seventh rotating element may be a third sun gear, the eighth rotating element may be a third ring gear, and the ninth rotating element may be a third planetary carrier, and the fourth planetary gear set may be a single-pinion planetary gear set, the tenth rotating element may be a fourth sun gear, the eleventh rotating element may be a fourth planetary carrier, and the twelfth rotating element may be a fourth ring gear.

The six control elements may include a first clutch selectively connecting the fourth rotating shaft and the eighth rotating shaft, a second clutch selectively connecting the input shaft and the fifth rotating shaft, a third clutch selectively connecting the third rotating shaft and the fifth rotating shaft, a fourth clutch selectively connecting the second rotating shaft and the sixth rotating shaft, a first brake selectively connecting the fifth rotating shaft and the transmission housing, and a second brake selectively connecting the ninth rotating shaft and the transmission housing.

The six control elements may include a first clutch selectively connecting the fourth rotating shaft and the eighth rotating shaft, a second clutch selectively connecting the fifth rotating shaft the sixth rotating shaft, a third clutch selectively connecting the third rotating shaft and the fifth rotating shaft, a fourth clutch selectively connecting the second rotating shaft and the sixth rotating shaft, a first brake selectively connecting the fifth rotating shaft and the transmission housing, and a second brake selectively connecting the ninth rotating shaft and the transmission housing.

Transmission stages implemented by selectively operating the six control elements may include a first forward transmission stage implemented by simultaneously operating the third and the fourth clutches and the second brake, a second forward transmission stage implemented by simultaneously operating the second and the third clutches and the second brake, a third forward transmission stage implemented by simultaneously operating the second and the fourth clutches and the second brake, a fourth forward transmission stage implemented by simultaneously operating the first and the second clutches and the second brake, a fifth forward transmission stage implemented by simultaneously operating the first, the second, and the fourth clutches, a sixth forward transmission stage implemented by simultaneously operating the first, the second, and the third clutches, a seventh forward transmission stage implemented by simultaneously operating the first, the third, and the fourth clutches, an eighth forward transmission stage implemented by simultaneously operating the first and the third clutches and the first brake, a ninth forward transmission stage implemented by simultaneously operating the first and the fourth clutches and the first brake, and a reverse transmission stage implemented by simultaneously operating the fourth clutch and the first and the second brakes.

Transmission stages implemented by selectively operating the six control elements may include a first forward transmission stage implemented by simultaneously operating the third and the fourth clutches and the second brake, a second forward transmission stage implemented by simultaneously operating the second and the third clutches and the second brake, a third forward transmission stage implemented by simultaneously operating the second and the fourth clutches and the second brake, a fourth forward transmission stage implemented by simultaneously operating the first and the fourth clutches and the second brake, a fifth forward transmission stage implemented by simultaneously operating the first, the second, and the fourth clutches, a sixth forward transmission stage implemented by simultaneously operating the first, the second, and the third clutches, a seventh forward transmission stage implemented by simultaneously operating the first, the third, and the fourth clutches, an eighth forward transmission stage implemented by simultaneously operating the first and the third clutches and the first brake, a ninth forward transmission stage implemented by simultaneously operating the first and the fourth clutches and the first brake, and a reverse transmission stage implemented by simultaneously operating the fourth clutch and the first and the second brakes.

According to various aspects of the present invention, a planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, a eleventh, and a twelfth rotating element, a first rotating shaft including the first rotating element and directly connected with a transmission housing, a second rotating shaft including the second rotating element, a third rotating shaft including the third, the seventh, and the tenth rotating element, a fourth rotating shaft including the fourth rotating element and the ninth rotating element, a fifth rotating shaft including the fifth rotating element and selectively connected with the third rotating shaft and the transmission housing simultaneously and selectively connected with the input shaft, a sixth rotating shaft including the sixth rotating element, selectively connected with the second rotating shaft, and selectively connected with the fifth rotating shaft, a seventh rotating shaft including the eighth rotating element and directly connected with the input shaft, an eighth rotating shaft including the eleventh rotating element and operating continuously as an output element by being selectively connected with the fourth rotating shaft and directly connected with the output shaft simultaneously, a ninth rotating shaft including the twelfth rotating element and selectively connected with the transmission housing, a first clutch selectively connecting the fourth rotating shaft and the eighth rotating shaft, a second clutch selectively connecting the input shaft and the fifth rotating shaft, a third clutch selectively connecting the third rotating shaft and the fifth rotating shaft, a fourth clutch selectively connecting the second rotating shaft and the sixth rotating shaft, a first brake selectively connecting the fifth rotating shaft and the transmission housing, and a second brake selectively connecting the ninth rotating shaft and the transmission housing.

A position of the second clutch may be changed such that the second clutch selectively connects the fifth rotating shaft and the sixth rotating shaft.

According to various aspects of the present invention, a planetary gear train of an automatic transmission for a vehicle may include an input shaft receiving rotary power of an engine, an output shaft outputting the rotary power with rotary speed changed, a first planetary gear set which may be a single-pinion planetary gear set, the first planetary gear set having a first sun gear, a first planetary carrier, and a first ring gear, a second planetary gear set which may be a single-pinion planetary gear set, the second planetary gear set having a second sun gear, a second planetary carrier, and a second ring gear, a third planetary gear set which may be a double-pinion planetary gear set, the third planetary gear set having a third sun gear, a third planetary carrier, and a third ring gear, a fourth planetary gear set which may be a single-pinion planetary gear set, the fourth planetary gear set having a fourth sun gear, a fourth planetary carrier, and a fourth ring gear, a first rotating shaft including the first sun gear and directly connected with a transmission housing, a second rotating shaft including the first planetary carrier, a third rotating shaft including the first ring gear, the third sun gear, and the fourth sun gear, a fourth rotating shaft including the second sun gear and the third planetary carrier, a fifth rotating shaft including the second planetary carrier, selectively connected with the third rotating shaft and the transmission housing simultaneously, and selectively connected with the input shaft, a sixth rotating shaft including the second ring gear, selectively connected with the second rotating shaft, and connected with the fifth rotating shaft, a seventh rotating shaft including the third ring gear and directly connected with the input shaft, an eighth rotating shaft including the fourth planetary carrier and operating continuously as an output element by being selectively connected with the fourth rotating shaft and directly connected with the output shaft simultaneously, a ninth rotating shaft including the fourth ring gear and selectively connected with the transmission housing, and six control elements disposed at portions selectively connecting the rotating shafts respectively or selectively connecting the rotating shafts and the transmission housing respectively.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operation table for each of transmission steps of respective control elements applied to the exemplary planetary gear trains according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
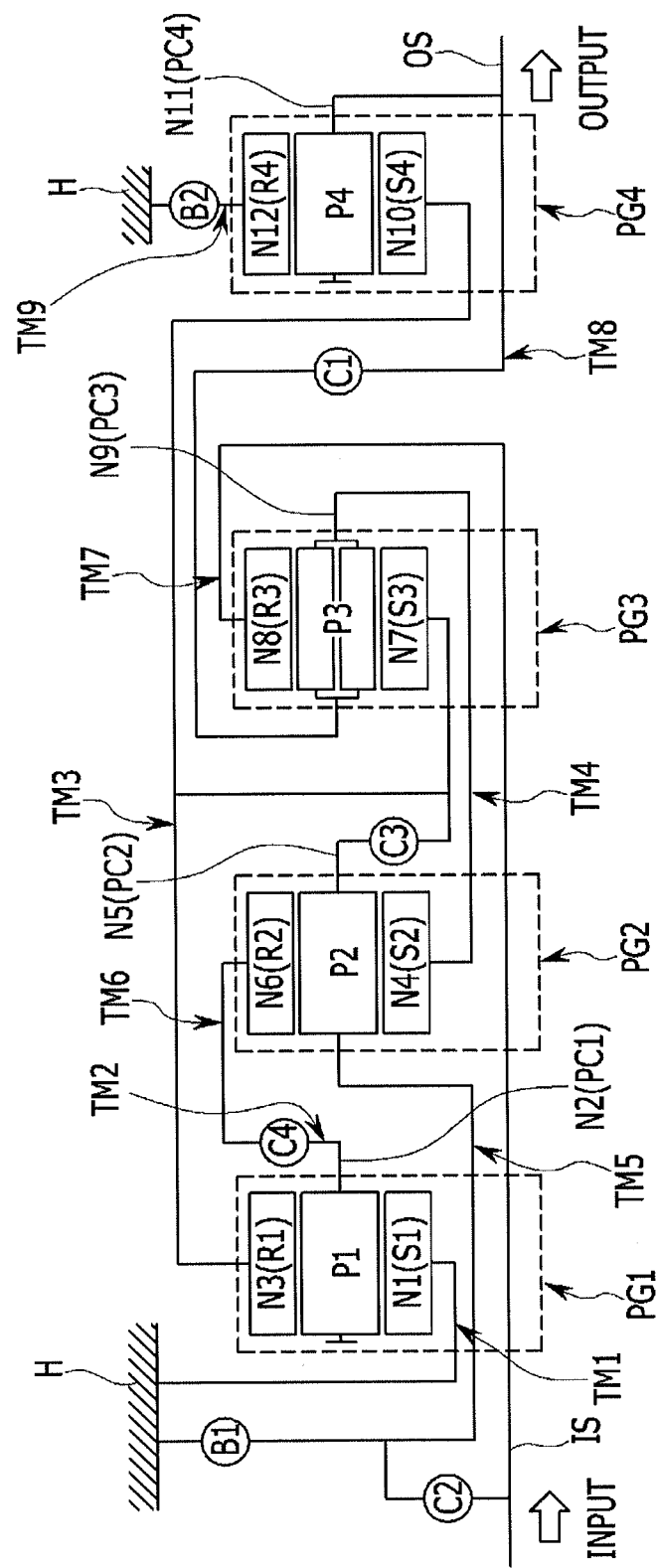
FIG. 1 is a schematic diagram of an exemplary planetary gear train according to the present invention.

FIG. 1 is a schematic diagram of an exemplary planetary gear train according to the present invention.

Referring to FIG. 1, the planetary gear train according to various embodiments of the present invention includes a first, a second, a third, and a fourth planetary gear set PG1, PG2, PG3, and PG4 disposed on a same axis line, an input shaft IS, an output shaft OS, nine rotating shafts TM1 to TM9 that connect respective rotating elements of the first, second, third, and fourth planetary gear sets PG1, PG2, PG3, and PG4 to each other, six control elements C1 to C4 and B1 and B2, and a transmission housing H.

Further, rotary power input from the input shaft IS is transmitted by an inter-complementation operation of the first, second, third, and fourth planetary gear sets PG1, PG2, PG3, and PG4 to be output through the output shaft OS with rotary speed changed.

The respective simple planetary gear sets are disposed in an order of the first, the second, the third, and the fourth planetary gear set PG1, PG2, PG3, and PG4 starting from an engine side.

The input shaft IS is an input member and rotary power from a crankshaft of an engine is torque-converted through a torque converter to be input into the input shaft IS.

The output shaft OS as an output member is disposed on a same axis line as the input shaft IS and transmits transmitted driving power to a driving shaft through a differential.

The first planetary gear set PG1, which is a single-pinion planetary gear set, includes a first sun gear S1 which is a first rotating element N1, a first planetary carrier PC1 which is a second rotating element N2 and rotatably supports a first pinion P1 which engages externally with the first sun gear S1, and a first ring gear R1 which is a third rotating element N3 and engages internally with the first pinion P1 as rotating elements.

The second planetary gear set PG2, which is a single-pinion planetary gear set, includes a second sun gear S2 which is a fourth rotating element N4, a second planetary carrier PC2 which is a fifth rotating element N5 and rotatably supports a second pinion P2 which engages externally with the second sun gear S2, and a second ring gear R2 which is a sixth rotating element N6 and engages internally with the second pinion P2.

The third planetary gear set PG3, which is a double-pinion planetary gear set, includes a third sun gear S3 which is a seventh rotating element N7, a third ring gear R3 which is a eighth rotating element N8 and engages internally with a third pinion P3 externally engaged with the third sun gear S3, and a third planetary carrier PC3 which is a ninth rotating element N9 and rotatably supports the third pinion P3.

The fourth planetary gear set PG4, which is a single-pinion planetary gear set, includes a fourth sun gear S4 which is a tenth rotating element N10, a fourth planetary carrier PC4 which is a eleventh rotating element N11 and rotatably supports a fourth pinion P4 which engages externally with the fourth sun gear S4, and a fourth ring gear R4 which is a twelfth rotating element N12 and engages internally with the fourth pinion P4.

In the first, second, third, fourth planetary gear sets PG1, PG2, PG3, and PG4, the third rotating element N3 is directly connected with the tenth rotating element N10, the fourth rotating element N4 is directly connected with the ninth rotating element N9, and the eighth rotating element N8 is directly connected with the input shaft IS, and the planetary gear sets have a total of nine rotating shafts TM1 to TM9.

Configurations of the nine rotating shafts TM1 to TM9 will be described below.

The first rotating shaft TM1 includes the first rotating element N1 (the first sun gear S1) and is directly connected with a transmission housing H.

The second rotating shaft TM2 includes the second rotating element N2 (the first planetary carrier PC1).

The third rotating shaft TM3 includes the third rotating element N3 (the first ring gear R1), the seventh rotating element N7 (the third sun gear S3), and the tenth rotating element N10 (the fourth sun gear S4).

The fourth rotating shaft TM4 includes the fourth rotating element N4 (the second sun gear S2) and the ninth rotating element N9 (the third planetary carrier PC3).

The fifth rotating shaft TM5 includes the fifth rotating element N5 (the second planetary carrier PC2) and is selectively connected with the third rotating shaft TM3 and the input shaft IS and selectively connected with the transmission housing H simultaneously.

The sixth rotating shaft TM6 includes the sixth rotating element N6 (the second ring gear R2) and is selectively connected with the second rotating shaft TM2.

The seventh rotating shaft TM7 includes the eighth rotating element N8 (the third ring gear R3) and operates continuously as an input element by being directly connected with the input shaft IS.

The eighth rotating shaft TM8 includes the eleventh rotating element N11 (the fourth planetary carrier PC4) and operates continuously as an output element by being selectively connected with the fourth rotating shaft TM4 and directly connected with the output shaft OS simultaneously.

The ninth rotating shaft TM9 includes the twelfth rotating element N12 (the fourth ring gear R4) and is selectively connected with the transmission housing H.

In addition, four clutches C1, C2, C3, and C4 which are control elements are disposed at portions selectively connecting the rotating shafts respectively, among the rotating shafts TM1 to TM9.

Further, two brakes B1 and B2 which are other control elements are disposed at portions selectively connecting the transmission housing H and the rotating shafts respectively, among the rotating shafts TM1 to TM9.

Layout positions of the six control elements C1 to C4 and B1 to B2 will be described below.

The first clutch C1 is interposed between the fourth rotating shaft TM4 and the eighth rotating shaft TM8 and operates such that the fourth rotating shaft TM4 and the eighth rotating shaft TM8 selectively operate as one body.

The second clutch C2 is interposed between the input shaft IS and the fifth rotating shaft TM5 and operates such that the input shaft IS and the fifth rotating shaft TM5 selectively operate as one body.

The third clutch C3 is interposed between the third rotating shaft TM3 and the fifth rotating shaft TM5 and operates such that the third rotating shaft TM3 and the fifth rotating shaft TM5 selectively operate as one body.

The fourth clutch C4 is interposed between the second rotating shaft TM2 and the sixth rotating shaft TM6 and operates such that the second rotating shaft TM2 and the sixth rotating shaft TM6 selectively operate as one body.

The first brake B1 is interposed between the fifth rotating shaft TM5 and the transmission housing H and operates such that the fifth rotating shaft TM5 can selectively operate as a fixing element.

The second brake B2 is interposed between the ninth rotating shaft TM9 and the transmission housing H and operates such that the ninth rotating shaft TM9 can selectively operate as a fixing element.

The respective control elements constituted by the first, the second, the third, and the fourth clutch C1, C2, C3, and C4 and the first and the second brake B1 and B2 as described above may be configured by multiple-disk hydraulic friction joining units which are friction-joined by hydraulic pressure.

Figure 2:
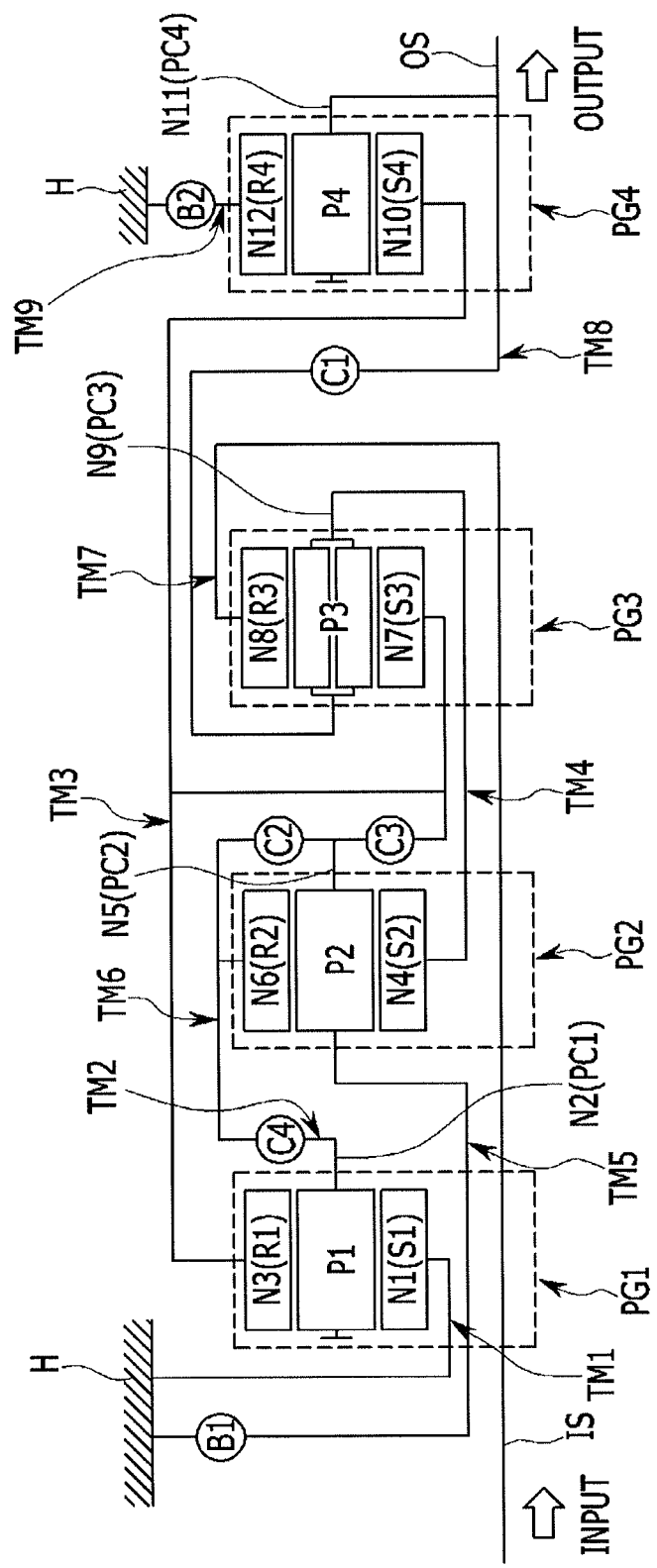
FIG. 2 is a schematic diagram of an exemplary planetary gear train according to the present invention.

FIG. 2 is a schematic diagram of a second exemplary planetary gear train according to the present invention.

Referring to FIG. 2, in a first exemplary planetary gear train according to the present invention, the second clutch C2 is interposed between the input shaft IS and the fifth rotating shaft TM5, but, in a second exemplary planetary gear train, the second clutch C2 is interposed between the fifth rotating shaft TM5 and the sixth rotating shaft TM6.

Further, the first and the second exemplary planetary gear train are different only in that they have different positions of the second clutch C2 respectively.

FIG. 3 is an operation table for each of transmission steps of respective friction elements applied to a first and a second exemplary planetary gear train according to the present invention.

As illustrated in FIG. 3, a transmission is performed while three control elements operate in the respective transmission steps, in a first and a second exemplary planetary gear train according to the present invention.

In a first forward transmission step 1ST, the third and the fourth clutch C3 and C4 and the second brake B2 simultaneously operate.

As a result, an input is made into the seventh rotating shaft TM7 in a state of the third rotating shaft TM3 and the fifth rotating shaft TM5 being connected by an operation of the third clutch C3 and the second rotating shaft TM2 and the sixth rotating shaft TM6 being connected by an operation of the fourth clutch C4, and the first forward transmission step 1ST is performed and an output is outputted through the eighth rotating shaft TM8 while the first rotating shaft TM1 operates as a fixing element and simultaneously the ninth rotating shaft TM9 operates as a fixing element by an operation of the second brake B2.

In a second forward transmission step 2ND, the second and the third clutch C2 and C3 and the second brake B2 simultaneously operate.

As a result, an input is made into the seventh rotating shaft TM7 in a state of the input shaft IS and the fifth rotating shaft TM5 being connected by an operation of the second clutch C2 and the third rotating shaft TM3 and the fifth rotating shaft TM5 being connected by an operation of the third clutch C3, and the second forward transmission step 2ND is performed and an output is outputted through the eighth rotating shaft TM8 while the first rotating shaft TM1 operates as a fixing element and simultaneously the ninth rotating shaft TM9 operates as a fixing element by an operation of the second brake B2.

In a third forward transmission step 3RD, the second and the fourth clutch C2 and C4 and the second brake B2 simultaneously operate.

As a result, an input is made into the seventh rotating shaft TM7 in a state of the input shaft IS and the fifth rotating shaft TM5 being connected by an operation of the second clutch C2 and the second rotating shaft TM2 and the sixth rotating shaft TM6 being connected by an operation of the fourth clutch C4, and the third forward transmission step 3RD is performed and an output is outputted through the eighth rotating shaft TM8 while the first rotating shaft TM1 operates as a fixing element and simultaneously the ninth rotating shaft TM9 operates as a fixing element by an operation of the second brake B2.

In a fourth forward transmission step 4TH, the first and the second clutch C1 and C2 and the second brake B2 simultaneously operate.

As a result, an input is made into the seventh rotating shaft TM7 in a state of the fourth rotating shaft TM4 and the eighth rotating shaft TM8 being connected by an operation of the first clutch C1 and the input shaft IS and the fifth rotating shaft TM5 being connected by an operation of the second clutch C2, and the fourth forward transmission step 4TH is performed and an output is outputted through the eighth rotating shaft TM8 while the first rotating shaft TM1 operates as a fixing element and simultaneously the ninth rotating shaft TM9 operates as a fixing element by an operation of the second brake B2.

The fourth forward transmission step 4TH can also be implemented by an operation of other control elements.

That is, in another fourth forward transmission step 4TH, the first and the fourth clutch C1 and C4 and the second brake B2 simultaneously operate.

As a result, an input is made into the seventh rotating shaft TM7 in a state of the fourth rotating shaft TM4 and the eighth rotating shaft TM8 being connected by an operation of the first clutch C1 and the second rotating shaft TM2 and the sixth rotating shaft TM6 being connected by an operation of the fourth clutch C4, the fourth forward transmission step 4TH is performed and an output is outputted through the eighth rotating shaft TM8 while the first rotating shaft TM1 operates as a fixing element and simultaneously the ninth rotating shaft TM9 operates as a fixing element by an operation of the second brake B2.

In a fifth forward transmission step 5TH, the first, the second, and the fourth clutch C1, C2, and C4 simultaneously operate.

As a result, an input is made into the seventh rotating shaft TM7 in a state of the fourth rotating shaft TM4 and the eighth rotating shaft TM8 being connected by an operation of the first clutch C1, the input shaft IS and the fifth rotating shaft TM5 being connected by an operation of the second clutch C2, and the second rotating shaft TM2 and the sixth rotating shaft TM6 being connected by an operation of the fourth clutch C4, and the fifth forward transmission step 5TH is performed and an output is outputted through the eighth rotating shaft TM8 while the first rotating shaft TM1 operates as a fixing element.

In a sixth forward transmission step 6TH, the first, the second, and the third clutch C1, C2, and C3 simultaneously operate.

As a result, an input is made into the seventh rotating shaft TM7 in a state of the fourth rotating shaft TM4 and the eighth rotating shaft TM8 being connected by an operation of the first clutch C1, the input shaft IS and the fifth rotating shaft TM5 being connected by an operation of the second clutch C2, and the third rotating shaft TM3 and the fifth rotating shaft TM5 being connected by an operation of the third clutch C3, and the sixth forward transmission step 6TH is performed and an output is outputted through the eighth rotating shaft TM8 while the first rotating shaft TM1 operates as a fixing element.

In a seventh forward transmission step 7TH, the first, the third, and the fourth clutch C1, C3, and C4 simultaneously operate.

As a result, an input is made into the seventh rotating shaft TM7 in a state of the fourth rotating shaft TM4 and the eighth rotating shaft TM8 being connected by an operation of the first clutch C1, the third rotating shaft TM3 and the fifth rotating shaft TM5 being connected by an operation of the third clutch C3, and the second rotating shaft TM2 and the sixth rotating shaft TM6 being connected by an operation of the fourth clutch C4, and the seventh forward transmission step 7TH is performed and an output is outputted through the eighth rotating shaft TM8 while the first rotating shaft TM1 operates as a fixing element.

In an eighth forward transmission step 8TH, the first and the third clutch C1 and C3 and the first brake B1 simultaneously operate.

As a result, an input is made into the seventh rotating shaft TM7 in a state of the fourth rotating shaft TM4 and the eighth rotating shaft TM8 being connected by an operation of the first clutch C1, the third rotating shaft TM3 and the fifth rotating shaft TM5 being connected by an operation of the third clutch C3, and the eighth forward transmission step 8TH is performed and an output is outputted through the eighth rotating shaft TM8 while the first rotating shaft TM1 operates as a fixing element and simultaneously the fifth rotating shaft TM5 operates as a fixing element by an operation of the first brake B1.

In a ninth forward transmission step 9TH, the first and the fourth clutch C1 and C4 and the first brake B1 simultaneously operate.

As a result, an input is made into the seventh rotating shaft TM7 in a state of the fourth rotating shaft TM4 and the eighth rotating shaft TM8 being connected by an operation of the first clutch C1 and the second rotating shaft TM2 and the sixth rotating shaft TM6 being connected by an operation of the fourth clutch C4, and the ninth forward transmission step 9TH is performed and an output is outputted through the eighth rotating shaft TM8 while the first rotating shaft TM1 operates as a fixing element and simultaneously the fifth rotating shaft TM5 operates as a fixing element by an operation of the first brake B1.

In a reverse transmission step REV, the fourth clutch C4 and the first and the second brake B1 and B2 simultaneously operate.

As a result, an input is made into the seventh rotating shaft TM7 in a state of the second rotating shaft TM2 and the sixth rotating shaft TM6 being connected by an operation of the fourth clutch C4, the reverse transmission step REV is performed and an output is outputted through the eighth rotating shaft TM8 while the first rotating shaft TM1, the fifth rotating shaft TM5, and ninth rotating shaft TM9 operate as fixing elements by an operation of the first and the second brake B1 and B2.

The above transmission steps are about a first exemplary planetary gear train of FIG. 1 according to the present invention. In a second exemplary planetary gear train of FIG. 2, only the position of the second clutch C2 is changed. That is, the second clutch C2 is interposed between the fifth rotating shaft TM5 and the sixth rotating shaft TM6 in the second planetary gear train.

As described above, in the planetary gear train according to various embodiments of the present invention, four planetary gear sets PG1, PG2, PG3, and PG4 may implement the forward 9-speed and reverse 1-speed transmission steps through the operation-control of four clutches C1, C2, C3, and C4 and two brakes B1 and B2.

Further, drivability such as acceleration before and after a speed change and rhythmic feeling of engine speed can be improved because all the step ratios except a step ratio between forward 6/7 transmission steps are greater than 1.2 and thereby linearity is secured.

In addition, operation efficiency of an engine can be maximized because an entire speed ratio is secured to be equal to or greater than 9.0.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft receiving rotary power of an engine;
    an output shaft outputting the rotary power with rotary speed changed;
    a first planetary gear set including a first, a second, and a third rotating element;
    a second planetary gear set including a fourth, a fifth, and a sixth rotating element;
    a third planetary gear set including a seventh, an eighth, and a ninth rotating element;
    a fourth planetary gear set including a tenth, an eleventh, and a twelfth rotating element; and
    six control elements disposed between one of the rotating elements and another or the input shaft, between one of the rotating elements and the output shaft, or between one of the rotating elements and a transmission housing,
    wherein the input shaft is directly connected with the eighth rotating element,
    the output shaft is directly connected with the eleventh rotating element and selectively connected with the ninth rotating element simultaneously,
    the eleventh rotating element is selectively connected with the ninth rotating element,
    the third rotating element is directly connected with the tenth rotating element,
    the third rotating element is directly connected with the seventh rotating element,
    the second rotating element is selectively connected with the sixth rotating element,
    the fourth rotating element is directly connected with the ninth rotating element, and
    the first rotating element is directly connected with the transmission housing, and
    wherein the planetary gear train implements transmission steps of 9 forward speeds and at least one reverse speed while three control elements operate among the six control elements.

2. The planetary gear train of claim 1, wherein:
    the fifth rotating element is selectively connected with the transmission housing and the seventh rotating element simultaneously,
    the twelfth rotating element is selectively connected with the transmission housing, and
    at least two of the fourth, the fifth, and the sixth rotating element in the second planetary gear set are selectively connected with other rotating elements respectively.

3. The planetary gear train of claim 1, wherein:
    the first, the second, and the third rotating elements of the first planetary gear set are a sun gear, a planetary carrier, and a ring gear respectively,
    the fourth, the fifth, and the sixth rotating elements of the second planetary gear set are a sun gear, a planetary carrier, a ring gear respectively,
    the seventh, the eighth, and the ninth rotating elements of the third planetary gear set are a sun gear, a ring gear, and a planetary carrier respectively, and
    the tenth, the eleventh, and the twelfth rotating elements of the fourth planetary gear set are a sun gear, a planetary carrier, and a ring gear respectively.

4. The planetary gear train of claim 1, wherein the six control elements comprise two brakes and four clutches.

5. A planetary gear train of an automatic transmission for a vehicle comprising:
    an input shaft receiving rotary power of an engine;
    an output shaft outputting the rotary power with rotary speed changed;
    a first planetary gear set including a first, a second, and a third rotating element;
    a second planetary gear set including a fourth, a fifth, and a sixth rotating element;
    a third planetary gear set including a seventh, an eighth, and a ninth rotating element;
    a fourth planetary gear set including a tenth, an eleventh, and a twelfth rotating element;
    six control elements disposed between one of the rotating elements and another or the input shaft, between one of the rotating elements and the output shaft, or between one of the rotating elements and a transmission housing;
a first rotating shaft including the first rotating element and directly connected with a transmission housing;
a second rotating shaft including the second rotating element;
a third rotating shaft including the third, the seventh, and tenth rotating elements;
a fourth rotating shaft including the fourth rotating element and the ninth rotating element;
a fifth rotating shaft including the fifth rotating element and selectively connected with the third rotating shaft and the transmission housing simultaneously and selectively connected with the input shaft;
a sixth rotating shaft including the sixth rotating element, selectively connected with the second rotating shaft, and connected with the fifth rotating shaft;
a seventh rotating shaft including the eighth rotating element and directly connected with the input shaft;
an eighth rotating shaft including the eleventh rotating element and operating continuously as an output element by being selectively connected with the fourth rotating shaft and directly connected with the output shaft simultaneously; and
a ninth rotating shaft including the twelfth rotating element and selectively connected with the transmission housing.

6. The planetary gear train of claim 5, wherein:
the first planetary gear set is a single-pinion planetary gear set, the first rotating element is a first sun gear, the second rotating element is a first planetary carrier, and the third rotating element is a first ring gear,
wherein the second planetary gear set is a single-pinion planetary gear set, the fourth rotating element is a second sun gear, the fifth rotating element is a second planetary carrier, and the sixth rotating element is a second ring gear,
wherein the third planetary gear set is a double-pinion planetary gear set, the seventh rotating element is a third sun gear, the eighth rotating element is a third ring gear, and the ninth rotating element is a third planetary carrier, and
wherein the fourth planetary gear set is a single-pinion planetary gear set, the tenth rotating element is a fourth sun gear, the eleventh rotating element is a fourth planetary carrier, and the twelfth rotating element is a fourth ring gear.

7. The planetary gear train of claim 5, wherein the six control elements comprise:
a first clutch selectively connecting the fourth rotating shaft and the eighth rotating shaft;
a second clutch selectively connecting the input shaft and the fifth rotating shaft;
a third clutch selectively connecting the third rotating shaft and the fifth rotating shaft;
a fourth clutch selectively connecting the second rotating shaft and the sixth rotating shaft;
a first brake selectively connecting the fifth rotating shaft and the transmission housing; and
a second brake selectively connecting the ninth rotating shaft and the transmission housing.

8. The planetary gear train of claim 5, wherein the six control elements comprise:
a first clutch selectively connecting the fourth rotating shaft and the eighth rotating shaft;
a second clutch selectively connecting the fifth rotating shaft the sixth rotating shaft;
a third clutch selectively connecting the third rotating shaft and the fifth rotating shaft;
a fourth clutch selectively connecting the second rotating shaft and the sixth rotating shaft;
a first brake selectively connecting the fifth rotating shaft and the transmission housing; and
a second brake selectively connecting the ninth rotating shaft and the transmission housing.

9. The planetary gear train of claim 7, wherein transmission stages implemented by selectively operating the six control elements include:
a first forward transmission stage implemented by simultaneously operating the third and the fourth clutches and the second brake;
a second forward transmission stage implemented by simultaneously operating the second and the third clutches and the second brake;
a third forward transmission stage implemented by simultaneously operating the second and the fourth clutches and the second brake;
a fourth forward transmission stage implemented by simultaneously operating the first and the second clutches and the second brake;
a fifth forward transmission stage implemented by simultaneously operating the first, the second, and the fourth clutches;
a sixth forward transmission stage implemented by simultaneously operating the first, the second, and the third clutches;
a seventh forward transmission stage implemented by simultaneously operating the first, the third, and the fourth clutches;
an eighth forward transmission stage implemented by simultaneously operating the first and the third clutches and the first brake;
a ninth forward transmission stage implemented by simultaneously operating the first and the fourth clutches and the first brake; and
a reverse transmission stage implemented by simultaneously operating the fourth clutch and the first and the second brakes.

10. The planetary gear train of claim 7, wherein transmission stages implemented by selectively operating the six control elements include:
a first forward transmission stage implemented by simultaneously operating the third and the fourth clutches and the second brake;
a second forward transmission stage implemented by simultaneously operating the second and the third clutches and the second brake;
a third forward transmission stage implemented by simultaneously operating the second and the fourth clutches and the second brake;
a fourth forward transmission stage implemented by simultaneously operating the first and the fourth clutches and the second brake;
a fifth forward transmission stage implemented by simultaneously operating the first, the second, and the fourth clutches;
a sixth forward transmission stage implemented by simultaneously operating the first, the second, and the third clutches;
a seventh forward transmission stage implemented by simultaneously operating the first, the third, and the fourth clutches;

an eighth forward transmission stage implemented by simultaneously operating the first and the third clutches and the first brake;

a ninth forward transmission stage implemented by simultaneously operating the first and the fourth clutches and the first brake; and a reverse transmission stage implemented by simultaneously operating the fourth clutch and the first and the second brakes.

11. A planetary gear train of an automatic transmission for a vehicle comprising:

an input shaft receiving rotary power of an engine;

an output shaft outputting the rotary power with rotary speed changed;

a first planetary gear set including a first, a second, and a third rotating element;

a second planetary gear set including a fourth, a fifth, and a sixth rotating element;

a third planetary gear set including a seventh, an eighth, and a ninth rotating element;

a fourth planetary gear set including a tenth, a eleventh, and a twelfth rotating element;

a first rotating shaft including the first rotating element and directly connected with a transmission housing;

a second rotating shaft including the second rotating element;

a third rotating shaft including the third, the seventh, and the tenth rotating element;

a fourth rotating shaft including the fourth rotating element and the ninth rotating element;

a fifth rotating shaft including the fifth rotating element and selectively connected with the third rotating shaft and the transmission housing simultaneously and selectively connected with the input shaft;

a sixth rotating shaft including the sixth rotating element, selectively connected with the second rotating shaft, and selectively connected with the fifth rotating shaft;

a seventh rotating shaft including the eighth rotating element and directly connected with the input shaft;

an eighth rotating shaft including the eleventh rotating element and operating continuously as an output element by being selectively connected with the fourth rotating shaft and directly connected with the output shaft simultaneously;

a ninth rotating shaft including the twelfth rotating element and selectively connected with the transmission housing;

a first clutch selectively connecting the fourth rotating shaft and the eighth rotating shaft;

a second clutch selectively connecting the input shaft and the fifth rotating shaft;

a third clutch selectively connecting the third rotating shaft and the fifth rotating shaft;

a fourth clutch selectively connecting the second rotating shaft and the sixth rotating shaft;

a first brake selectively connecting the fifth rotating shaft and the transmission housing; and a second brake selectively connecting the ninth rotating shaft and the transmission housing.

12. The planetary gear train of claim 11, wherein:

the first planetary gear set is a single-pinion planetary gear set, the first rotating element is a first sun gear, the second rotating element is a first planetary carrier, and the third rotating element is a first ring gear, wherein the second planetary gear set is a single-pinion planetary gear set, the fourth rotating element is a second sun gear, the fifth rotating element is a second planetary carrier, and the sixth rotating element is a second ring gear, wherein the third planetary gear set is a double-pinion planetary gear set, the seventh rotating element is a third sun gear, the eighth rotating element is a third ring gear, and the ninth rotating element is a third planetary carrier, and wherein the fourth planetary gear set is a single-pinion planetary gear set, the tenth rotating element is a fourth sun gear, the eleventh rotating element is a fourth planetary carrier, the twelfth rotating element is a fourth ring gear.

13. The planetary gear train of claim 11, wherein a position of the second clutch is changed such that the second clutch selectively connects the fifth rotating shaft and the sixth rotating shaft.

14. The planetary gear train of claim 11, wherein transmission stages implemented by selectively operating the six control elements include:

a first forward transmission stage implemented by simultaneously operating the third and the fourth clutches and the second brake;

a second forward transmission stage implemented by simultaneously operating the second and the third clutches and the second brake;

a third forward transmission stage implemented by simultaneously operating the second and the fourth clutches and the second brake;

a fourth forward transmission stage implemented by simultaneously operating the first and the second clutches and the second brake;

a fifth forward transmission stage implemented by simultaneously operating the first, the second, and the fourth clutches;

a sixth forward transmission stage implemented by simultaneously operating the first, the second, and the third clutches;

a seventh forward transmission stage implemented by simultaneously operating the first, the third, and the fourth clutches;

an eighth forward transmission stage implemented by simultaneously operating the first and the third clutches and the first brake;

a ninth forward transmission stage implemented by simultaneously operating the first and the fourth clutches and the first brake; and a reverse transmission stage implemented by simultaneously operating the fourth clutch and the first and the second brakes.

15. The planetary gear train of claim 11, wherein transmission stages implemented by selectively operating the six control elements include:

a first forward transmission stage implemented by simultaneously operating the third and the fourth clutches and the second brake;

a second forward transmission stage implemented by simultaneously operating the second and the third clutches and the second brake;

a third forward transmission stage implemented by simultaneously operating the second and the fourth clutches and the second brake;

a fourth forward transmission stage implemented by simultaneously operating the first and the fourth clutches and the second brake;

a fifth forward transmission stage implemented by simultaneously operating the first, the second, and the fourth clutches;
a sixth forward transmission stage implemented by simultaneously operating the first, the second, and the third clutches;
a seventh forward transmission stage implemented by simultaneously operating the first, the third, and the fourth clutches;
an eighth forward transmission stage implemented by simultaneously operating the first and the third clutches and the first brake;
a ninth forward transmission stage implemented by simultaneously operating the first and the fourth clutches and the first brake; and
a reverse transmission stage implemented by simultaneously operating the fourth clutch and the first and the second brakes.

16. A planetary gear train of an automatic transmission for a vehicle comprising:
an input shaft receiving rotary power of an engine;
an output shaft outputting the rotary power with rotary speed changed;
a first planetary gear set which is a single-pinion planetary gear set, the first planetary gear set having a first sun gear, a first planetary carrier, and a first ring gear;
a second planetary gear set which is a single-pinion planetary gear set, the second planetary gear set having a second sun gear, a second planetary carrier, and a second ring gear;
a third planetary gear set which is a double-pinion planetary gear set, the third planetary gear set having a third sun gear, a third planetary carrier, and a third ring gear;
a fourth planetary gear set which is a single-pinion planetary gear set, the fourth planetary gear set having a fourth sun gear, a fourth planetary carrier, and a fourth ring gear;
a first rotating shaft including the first sun gear and directly connected with a transmission housing;
a second rotating shaft including the first planetary carrier;
a third rotating shaft including the first ring gear, the third sun gear, and the fourth sun gear;
a fourth rotating shaft including the second sun gear and the third planetary carrier;
a fifth rotating shaft including the second planetary carrier, selectively connected with the third rotating shaft and the transmission housing simultaneously, and selectively connected with the input shaft;
a sixth rotating shaft including the second ring gear, selectively connected with the second rotating shaft, and connected with the fifth rotating shaft;
a seventh rotating shaft including the third ring gear and directly connected with the input shaft;
an eighth rotating shaft including the fourth planetary carrier and operating continuously as an output element by being selectively connected with the fourth rotating shaft and directly connected with the output shaft simultaneously;
a ninth rotating shaft including the fourth ring gear and selectively connected with the transmission housing; and
six control elements disposed at portions selectively connecting the rotating shafts respectively or selectively connecting the rotating shafts and the transmission housing respectively.

17. The planetary gear train of claim 16, wherein the six control elements comprise:
a first clutch selectively connecting the fourth rotating shaft and the eighth rotating shaft;
a second clutch selectively connecting the input shaft and the fifth rotating shaft;
a third clutch selectively connecting the third rotating shaft and the fifth rotating shaft;
a fourth clutch selectively connecting the second rotating shaft and the sixth rotating shaft;
a first brake selectively connecting the fifth rotating shaft and the transmission housing; and
a second brake selectively connecting the ninth rotating shaft and the transmission housing.

18. The planetary gear train of claim 16, wherein the six control elements comprise:
a first clutch selectively connecting the fourth rotating shaft and the eighth rotating shaft;
a second clutch selectively connecting the fifth rotating shaft and the sixth rotating shaft;
a third clutch selectively connecting the third rotating shaft and the fifth rotating shaft;
a fourth clutch selectively connecting the second rotating shaft and the sixth rotating shaft;
a first brake selectively connecting the fifth rotating shaft and the transmission housing; and
a second brake selectively connecting the ninth rotating shaft and the transmission housing.

19. The planetary gear train of claim 17, wherein transmission stages implemented by selectively operating the six control elements include:
a first forward transmission stage implemented by simultaneously operating the third and the fourth clutches and the second brake;
a second forward transmission stage implemented by simultaneously operating the second and the third clutches and the second brake;
a third forward transmission stage implemented by simultaneously operating the second and the fourth clutches and the second brake;
a fourth forward transmission stage implemented by simultaneously operating the first and the second clutches and the second brake;
a fifth forward transmission stage implemented by simultaneously operating the first, the second, and the fourth clutches;
a sixth forward transmission stage implemented by simultaneously operating the first, the second, and the third clutches;
a seventh forward transmission stage implemented by simultaneously operating the first, the third, and the fourth clutches;
an eighth forward transmission stage implemented by simultaneously operating the first and the third clutches and the first brake;
a ninth forward transmission stage implemented by simultaneously operating the first and the fourth clutches and the first brake; and
a reverse transmission stage implemented by simultaneously operating the fourth clutch and the first and the second brakes.

20. The planetary gear train of claim 17, wherein transmission stages implemented by selectively operating the six control elements include:
a first forward transmission stage implemented by simultaneously operating the third and the fourth clutches and the second brake;

a second forward transmission stage implemented by simultaneously operating the second and the third clutches and the second brake;
a third forward transmission stage implemented by simultaneously operating the second and the fourth clutches and the second brake;
a fourth forward transmission stage implemented by simultaneously operating the first and the fourth clutches and the second brake;
a fifth forward transmission stage implemented by simultaneously operating the first, the second, and the fourth clutches;
a sixth forward transmission stage implemented by simultaneously operating the first, the second, and the third clutches;
a seventh forward transmission stage implemented by simultaneously operating the first, the third, and the fourth clutches;
an eighth forward transmission stage implemented by simultaneously operating the first and the third clutches and the first brake;
a ninth forward transmission stage implemented by simultaneously operating the first and the fourth clutches and the first brake; and
a reverse transmission stage implemented by simultaneously operating the fourth clutch and the first and the second brakes.

* * * * *